(12) United States Patent
Knight

(10) Patent No.: US 9,695,698 B2
(45) Date of Patent: Jul. 4, 2017

(54) AEROFOIL BLADE

(71) Applicant: ROLLS-ROYCE PLC, London (GB)

(72) Inventor: Mark John Knight, Ashbourne (GB)

(73) Assignee: ROLLS-ROYCE plc, London (GB)

( * ) Notice: Subject to any disclaimer, the term of this patent is extended or adjusted under 35 U.S.C. 154(b) by 646 days.

(21) Appl. No.: 14/451,690

(22) Filed: Aug. 5, 2014

(65) Prior Publication Data

US 2015/0300181 A1 Oct. 22, 2015

(30) Foreign Application Priority Data

Aug. 9, 2013 (GB) .................................. 1314296.3

(51) Int. Cl.
*F01D 5/30* (2006.01)
*F01D 5/14* (2006.01)
*F01D 11/16* (2006.01)

(52) U.S. Cl.
CPC ............ *F01D 5/3038* (2013.01); *F01D 5/141* (2013.01); *F01D 5/30* (2013.01); *F01D 11/16* (2013.01); *F05D 2230/60* (2013.01); *F05D 2240/24* (2013.01); *F05D 2240/30* (2013.01)

(58) Field of Classification Search
CPC .......... F01D 5/30; F01D 5/3038; F01D 5/303; F01D 5/141; F01D 11/16
See application file for complete search history.

(56) References Cited

U.S. PATENT DOCUMENTS

| 5,310,317 A | 5/1994 | Bailey et al. |
| 5,435,694 A * | 7/1995 | Kray ....................... F01D 5/141 416/219 R |
| 5,741,119 A * | 4/1998 | Heppenstall .......... F01D 5/3007 416/219 A |

(Continued)

FOREIGN PATENT DOCUMENTS

| EP | 2 436 883 A1 | 4/2012 |
| EP | 2 441 921 A1 | 4/2012 |
| GB | 2 058 945 | 4/1981 |

OTHER PUBLICATIONS

Mar. 14, 2014 British Search Report issued in British Application No. 1314296.3.

(Continued)

*Primary Examiner* — Nathaniel Wiehe
*Assistant Examiner* — Eric Zamora Alvarez
(74) *Attorney, Agent, or Firm* — Oliff PLC

(57) ABSTRACT

A turbomachine aerofoil blade has an aerofoil body portion and a dovetail root fixing at the base of the aerofoil body portion which slides, in use, into a correspondingly shaped slot of a rotor of the turbomachine. The dovetail root fixing has a neck portion, and support flanks engage with matching angled surfaces of the slot under centrifugal loading of the aerofoil blade to support the aerofoil blade on the rotor. The neck portion is shaped such that a rotational adjustment of the aerofoil blade relative to its angular position when supported under centrifugal loading is needed to provide adequate clearance at the neck portion to allow the dovetail (Continued)

root fixing to slide into the slot. On centrifugal loading the engagement of the support flanks with the matching angled surfaces of the slot forces a reversal of the rotational adjustment and reduces the clearance at the neck portion.

17 Claims, 9 Drawing Sheets

(56) References Cited

U.S. PATENT DOCUMENTS

| | | | | |
|---|---|---|---|---|
| 7,168,919 | B2* | 1/2007 | Blatchford | F01D 5/3038 416/215 |
| 7,708,529 | B2* | 5/2010 | Klingels | F01D 5/3038 416/220 R |
| 8,899,933 | B2* | 12/2014 | Farineau | F01D 5/225 416/215 |
| 2011/0293429 | A1* | 12/2011 | Barnett | F01D 5/3007 416/219 R |
| 2013/0195668 | A1 | 8/2013 | Milne | |

OTHER PUBLICATIONS

Feb. 18, 2015 Search Report issued in EP Application No. 14179795.

* cited by examiner (a)

(b)

AEROFOIL BLADE

FIELD OF HE INVENTION

The present invention relates to a turbomachine aerofoil blade, such as a compressor blade.

BACKGROUND OF THE INVENTION

In gas turbine engines, compressor blades are typically supported on a compressor disc by a dovetail root fixing, as shown in FIG. 1.

The dovetail root fixing has a neck portion 100 at the base of the aerofoil body portion 102 of the blade, and a radially inwards dovetail portion 104 which extends outwardly from the neck portion to provide angled (typically 45°) support flanks 106 at either side of the fixing. The fixing is joined to the compressor disc 108 by sliding along a correspondingly-shaped slot 110. To allow assembly of the blade in the disc, a clearance C is provided between the neck portion and the disc slot. When the disc spins, the blade is centrifuged radially outwardly and the support flanks 106 engage with matching angled surfaces 112 of the slot to support the blade in the disc.

There are typically two approaches for assembling compressor blades onto a compressor disc. The first is to provide a row of slots around the circumference of the disc (one of which is shown in FIG. 1), with each slot being loaded with a respective blade. The slots may be axial (i.e. parallel to the engine centre line) or skewed axial (i.e. angled to the centre line but nonetheless with a significant axial component). The second approach is to provide a circumferentially extending slot around the circumference of the disc, and to load a row of blades into the slot. FIG. 2 shows schematically a longitudinal cross-section through a compressor section of a gas turbine engine, and illustrates an axially-loaded compressor blade 114 and a circumferentially-loaded compressor blade 116.

To enable tight tolerance control of the tips of all the compressor blades, the tips can be ground using high speed grinding. This involves rotating the assembled rotor, and grinding the blade tips with a rotating grinding wheel. The tip tolerance is measured during the grind, and tolerances to a few microns can be achieved. The complete rotor can then be mounted into the engine.

However, when the rotor spins and the blade centrifuges outward, each blade adopts a position within a range of tilt angles permitted by the neck clearance, as illustrated by FIG. 3 which superimposes the blade positions on the cross-section of FIG. 1 for the two extreme tilt angles of the blade, one tilt angle eliminating the left hand clearance C and the other eliminating the right hand clearance C. Similarly, FIG. 4 shows schematically three superimposed positions of a compressor blade relative to its circumferentially extending compressor disc slot, namely: a forwarded tilted position, a non-tilted position and a rearward tilted position. The same forward-to-rearward tilting effect arises in blades mounted in skewed-axial slots as the slots are angled to the centre line. For the small angles of blade tilt possible within a typical root neck clearance, the friction within the dovetail root fixing is sufficient to lock the blade in the position it ends up in when the spool is rotated up. This position is effectively random and changes for every blade on every spool start up.

The forward-to-rearward tilting can cause errors in the blade tip grinding process if the rotor is stopped and restarted (e.g. when a damaged blade is replaced). More significantly, during engine running, the tilting can cause deeper rubs in the casing liner above the blade leading edge (LE) & trailing edge (TE) tips, than above the middle of the blade, creating an M-shaped rub. This has implications for compressor efficiency. In addition, the LE and TE rubs, if deep, can lead to cracking in the tip of the blade, and ultimately the loss of a blade tip corner.

FIG. 5 shows the effect of blade tilt on blade tip height. Because of blade tilting, the blades in a set may exhibit variations in height even after grinding. Moreover, if a blade is tilted fully anti-clockwise 101a in the root when it is ground, the blade will be X1 shorter than a blade that was centralised 101b during grind. If this blade then rotates fully clockwise 101c during a subsequent run in the engine, the blade tip will be (X1+X2) radially further outward that the nominal desired tip position. This will result in the blade tip rubbing out the abradable liner by an additional (X1+X2) depth, which increases the blade tip running clearances by (X1+X2) for a blade with a nominal blade tip position. For a blade that tilted clockwise during grinding but then tilts anticlockwise during running, the blade tip will be (X1+X2) radially more inward than a nominal tip. If this blade is running within a casing that has suffered the (X1+X2) additional rub, the additional tip clearance this blade will see is 2(X1+X2). The overall effect on running clearances and hence compressor efficiency and surge margin may be significant.

Another unfortunate effect of blade tilt associated with axial or skewed-axial disc slots, is the effect it has on the angle of the tip of the longest blade. In the example shown in FIG. 5 the rotor rotational direction is clockwise i.e. from left to right in the diagram. The blade with the highest tip, as explained above, will have rotated clockwise by $\phi°$ relative to the position it was in when it was ground. As a result, the blade tip will have a negative relief (or clearance) angle with the casing of $\phi°$. This means its suction surface edge will touch the casing rather than the pressure surface edge. However, the blade tip will be a relatively inefficient cutting tool, due to the negative relief angle at this edge. As a consequence, for high incursions significant heat and blade vibration may be generated, causing over-cutting of the soft abradable liner due to heat build-up and aerofoil cracking due to vibration. Further, if the liner material heats up to above its maximum operating temperature, the material can soften and accumulate on the longest blade (which is doing the rubbing). This accumulation in turn makes the blade longer, causing it to machine out the liner around the complete circumference. All the other blades then run with a much increased tip clearance.

SUMMARY OF THE INVENTION

It would be desirable to provide a turbomachine aerofoil blade which is less susceptible to tilting at the dovetail root fixing.

Accordingly, in a first aspect, the present invention provides a turbomachine aerofoil blade having an aerofoil body portion and a dovetail root fixing at the base of the aerofoil body portion which slides, in use, into a correspondingly shaped slot of a rotor of the turbomachine, the dovetail root fixing having a neck portion, and a dovetail portion which extends outwardly from the neck portion to provide angled support flanks at either side of the fixing, the support flanks engaging with matching angled surfaces of the slot under centrifugal loading of the aerofoil blade to support the aerofoil blade on the rotor:

wherein the neck portion is shaped such that a rotational adjustment of the aerofoil blade relative to its angular position when supported under centrifugal loading is needed to provide adequate clearance at the neck portion to allow the dovetail root fixing to slide into the slot, while on centrifugal loading the engagement of the support flanks with the matching angled surfaces of the slot forces a reversal of the rotational adjustment and reduces the clearance at the neck portion.

Thus a reduced clearance at the neck portion can be achieved, which in turn can reduce the range of tilt angles permitted by the neck clearance. In this way, M-shaped rub at the blade tip can be reduced or eliminated, tip clearances can be improved, and liner over-cutting can be reduced or eliminated. However, the rotational adjustment of the blade during assembly prevents the reduced clearance from compromising ability to slide the dovetail root into the slot.

The aerofoil blade can be a compressor aerofoil blade. The turbomachine can be, or example, a gas or a steam turbine engine.

In a second aspect, the present invention provides a turbomachine rotor having a row of aerofoil blades according to the first aspect mounted thereto, the dovetail root fixing of each aerofoil blade being located in a correspondingly shaped slot of the rotor.

In a third aspect, the present invention provides a gas turbine engine having a compressor stage including the rotor and the row of aerofoil blades of the second aspect.

Optional features of the invention will now be set out. These are applicable singly or in any combination with any aspect of the invention.

The slot can extend circumferentially around the rotor (in which case the slot typically contains in use a row of blades), or can extend axially or in a skewed axial direction (in which case the rotor typically has a row of circumferentially spaced slots, each containing in use a respective blade).

The removal of the rotational adjustment can reduce the clearance to produce an interference fit at the neck portion. In this way, tilt of the blade at the dovetail root fixing can be substantially eliminated, with attendant performance advantages.

The axis of the rotational adjustment can be a radial direction of the turbomachine or can be along the direction of the slot.

The neck portion can be shaped to have a respective raised land at either side thereof, the rotational adjustment providing adequate clearance at the lands to allow the dovetail root fixing to slide into the slot, and, on centrifugal loading, the engagement of the support flanks with the matching angled surfaces of the slot removing the rotational adjustment and reducing the clearance at the lands. Away from the lands, the neck portion clearance can be greater. In this way, the rotational adjustment can be prevented from causing the neck portion to interfere with the sides of the slot when the dovetail root fixing is slid into the slot. Further, although the lands may need to be shaped with high precision, lesser precision may be sufficient for other parts of the neck portion. On a cross-section through the neck portion perpendicular to the axis of the rotational adjustment, the lands may be offset from each other on their respective sides of the neck portion. Such an offset can allow a small rotational adjustment to produce a large relative displacement of the lands.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF HE INVENTION

Figure 1:
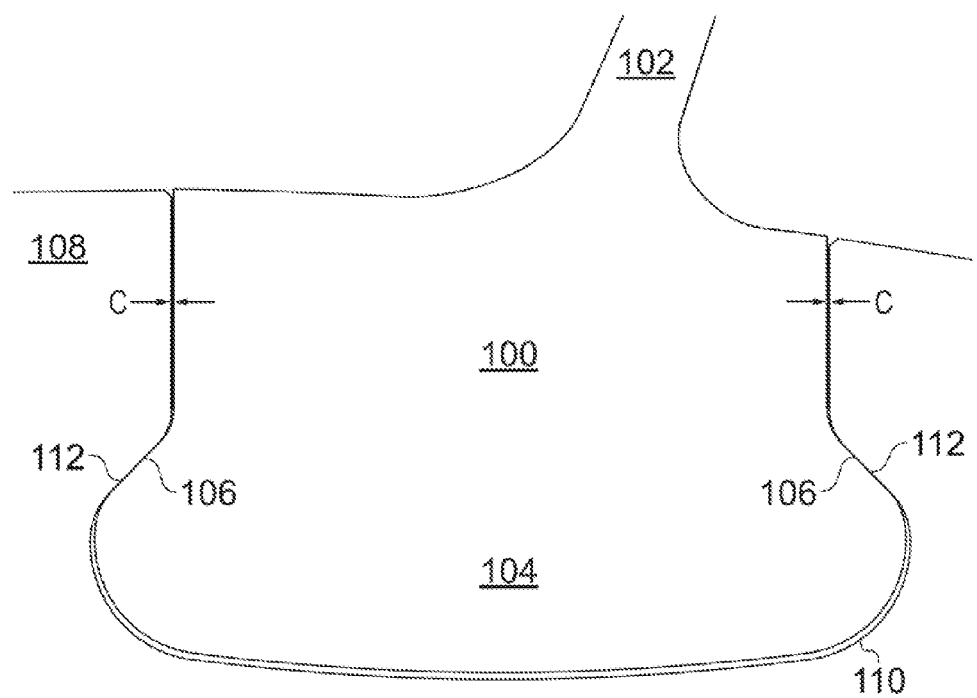
FIG. 1 shows schematically a cross-section through the dovetail root fixing of a compressor blade and the corresponding compressor disc slot.
Figure 2:
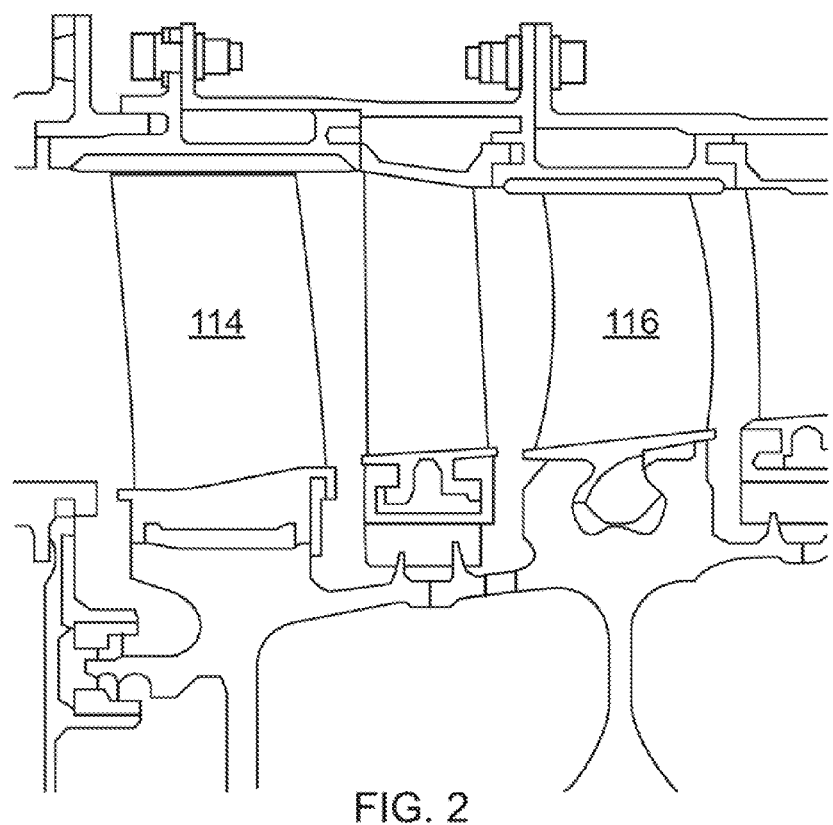
FIG. 2 shows schematically a longitudinal cross-section through a compressor section of a gas turbine engine.
Figure 3:
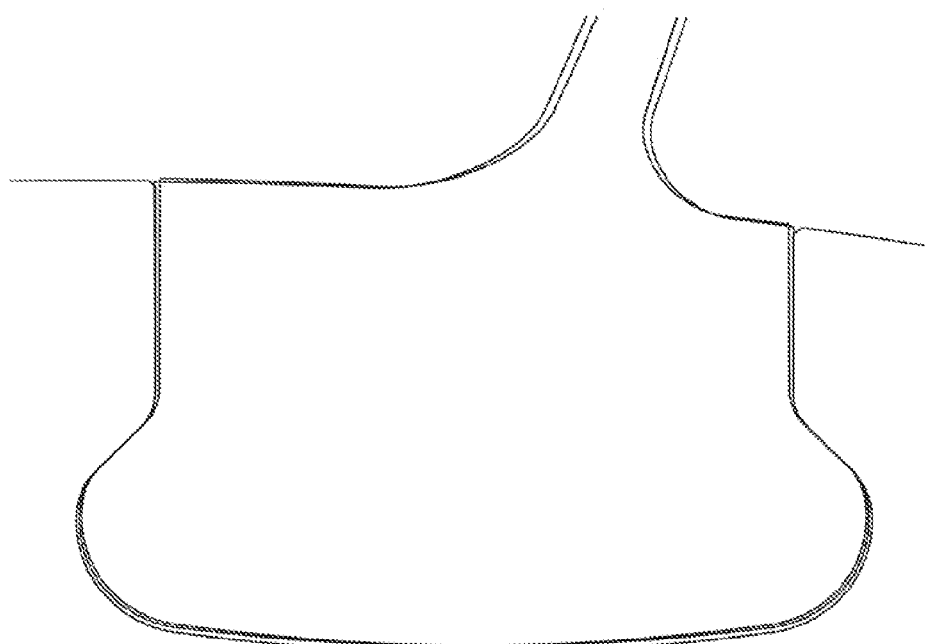
FIG. 3 superimposes the blade positions on the cross-section of Figure for two extreme title angles of the blade.
Figure 4:
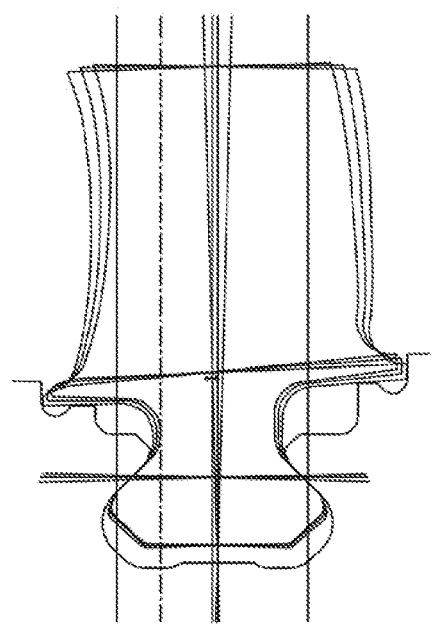
FIG. 4 shows schematically three superimposed positions of a compressor blade relative to its circumferentially extending compressor disc slot.
Figure 5:
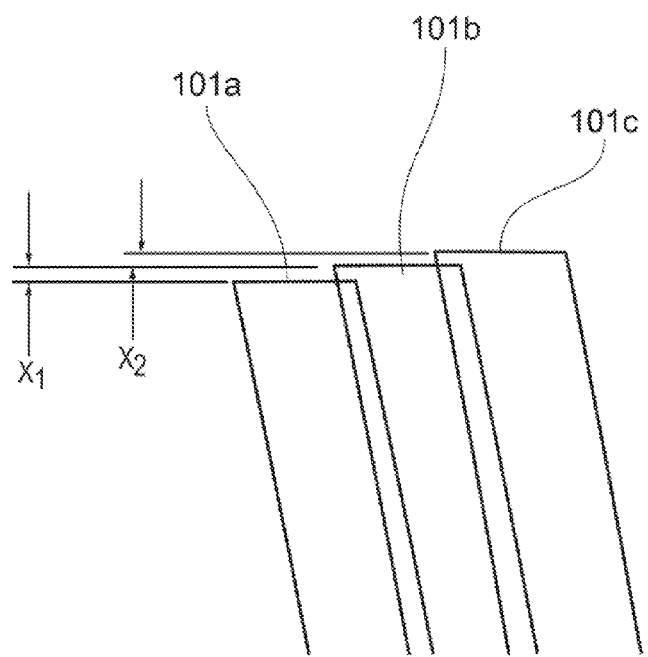
FIG. 5 shows the effect of blade tilt on blade tip height.
Figure 6:
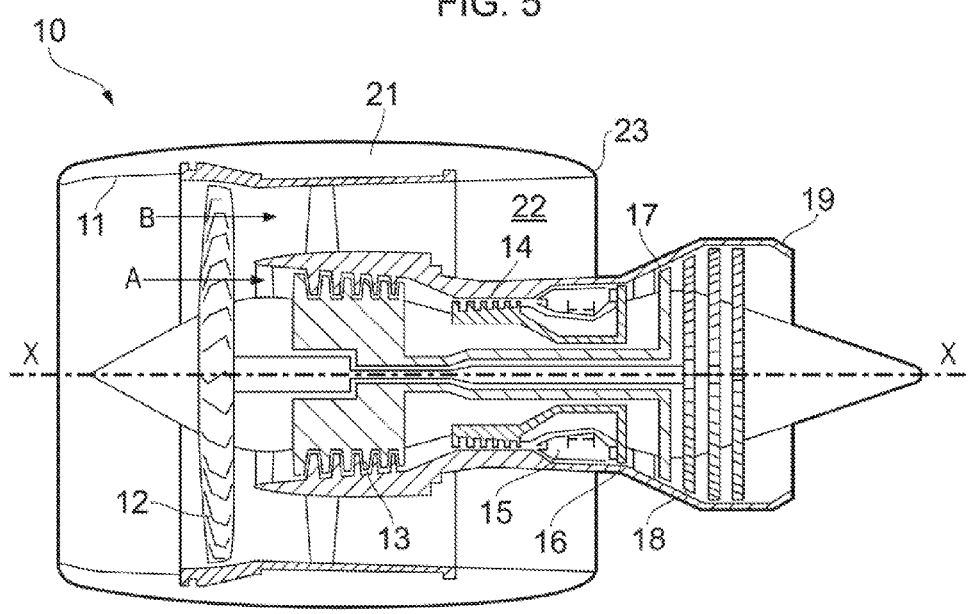
FIG. 6 shows schematically a longitudinal cross-section through a gas turbine engine.

With reference to FIG. 6, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The intermediate 13 and high 14 pressure compressor each comprise a plurality of compressor discs. Rows of compressor blades are mounted to the discs by slot and dovetail root fixing arrangements. The slots can extend circumferentially around the rotor, or can extend axially or in a skewed axial direction.

Figure 7:
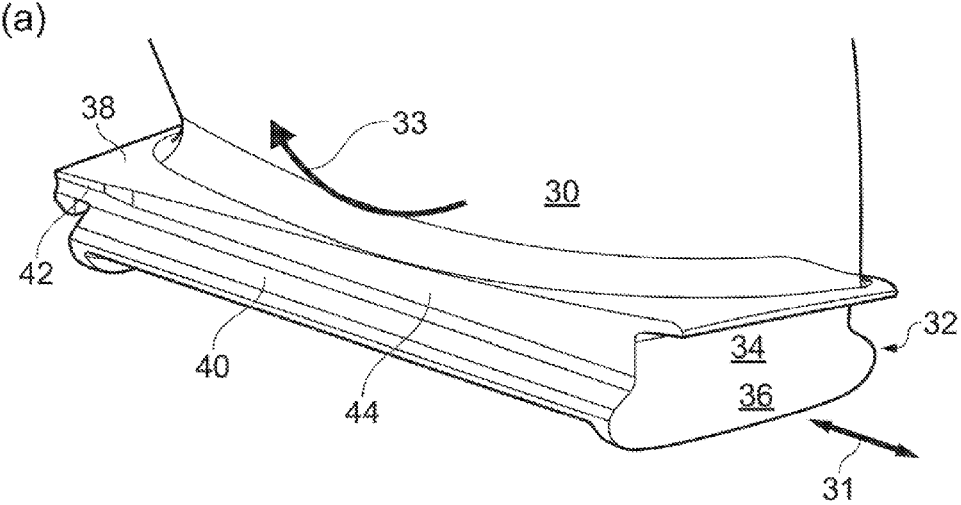
FIG. 7 shows (a) suction side and (b) pressure side perspective views of the base of an aerofoil body portion and dovetail root fixing of a compressor blade for mounting into a corresponding skewed axial slot.
Figure 7:
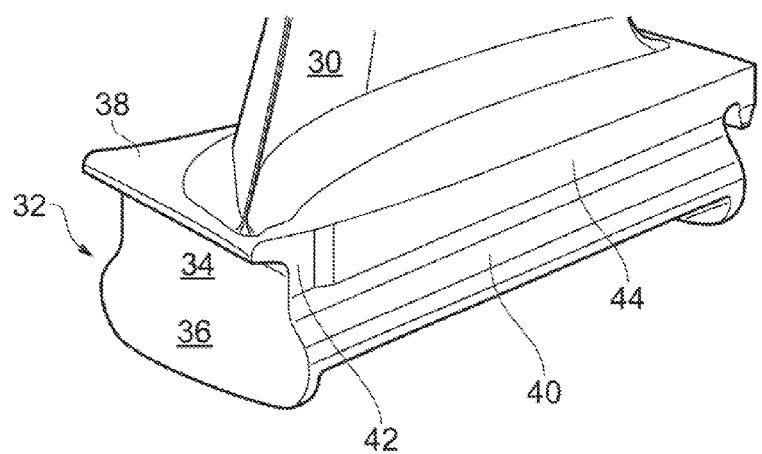

FIG. 7 shows (a) suction side and (b) pressure side perspective views of the base of the aerofoil body portion 30 and the dovetail root fixing 32 of one of the compressor blades for mounting into a corresponding skewed axial slot. The dovetail root fixing is configured so as to locate the blade in the same position within the slot for every spool start. To locate the aerofoil in the slot the blade is moved in the direction of arrow 31 with a slight rotation required around the axial axis as shown by arrow 33.

More particularly, the dovetail root fixing 32 has a neck portion 34 and a dovetail portion 3. The neck portion defines an air-washed platform 38 at the base of the aerofoil body portion 30. The dovetail portion extends outwardly from the neck portion to provide angled support flanks 40 at either side of the fixing. On spool start, the blade is centrifuged radially outwardly until the support flanks engage matching angled surfaces of the slot to support the blade on the disc. Each side of the neck portion provides a raised land 42 at one end (relative to the direction of sliding along the slot) thereof, with the rest of the side being a cut-back zone 44.

Figure 8:
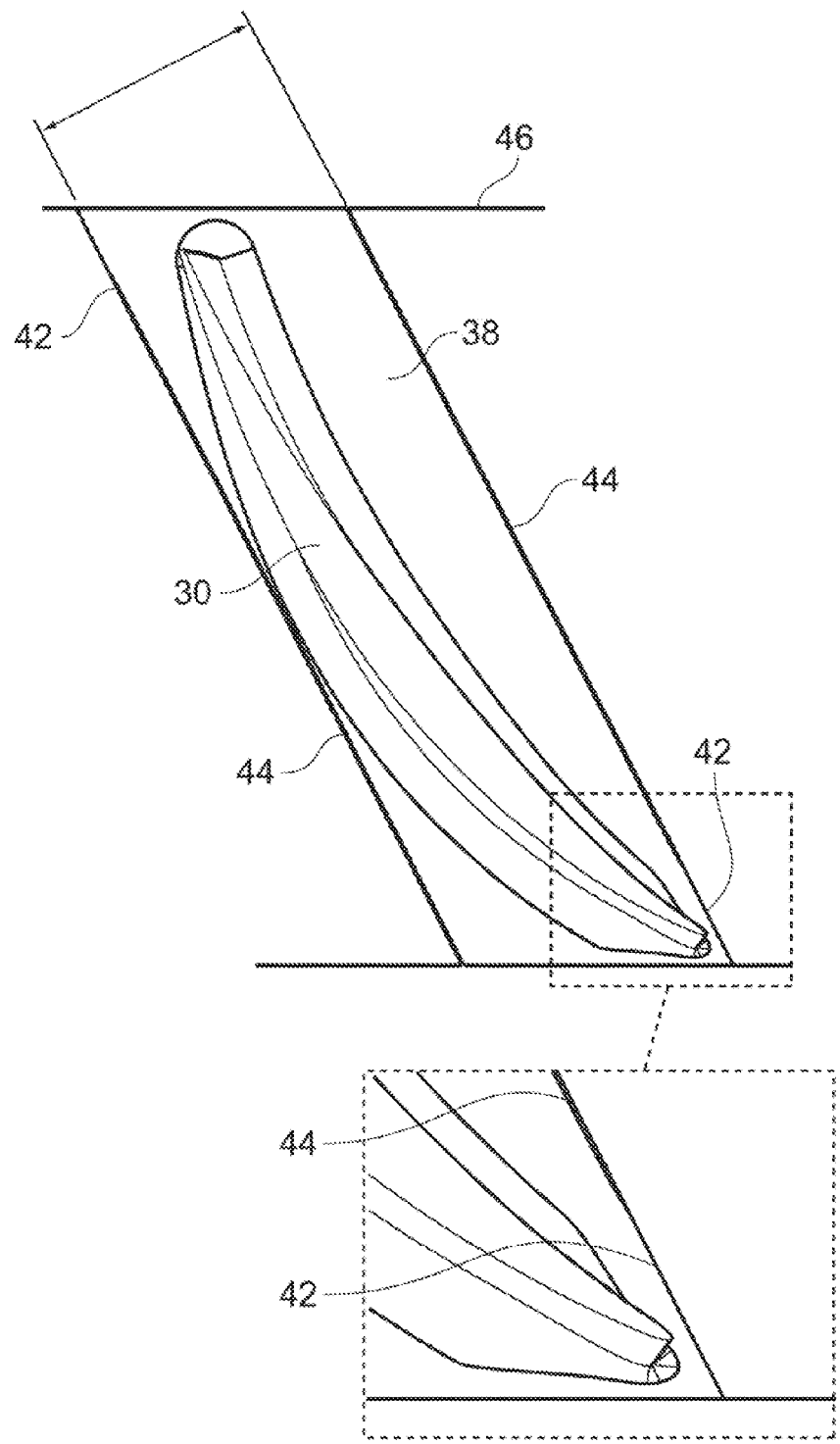
FIG. 8 shows a view of the blade of FIG. 7 onto the top of the blade platform, with the blade mounted onto a disc, and includes a close-up view of the leading edge end of the platform.

FIG. 8 shows a view of the blade of FIG. 7 onto the top of the platform 38, with the blade mounted onto the disc 46, and includes a close-up view of the leading edge end of the platform. The two lands 42 are offset from each other by virtue of their locations at opposite ends of the neck portion. In order to slide the blade into the slot, it is necessary to apply a slight rotational adjustment to the blade about the radial direction of the engine (i.e. in the plane of FIG. 8) to provide adequate clearance at the lands and prevent them interfering with the sides of the slot. However, when the spool spins up, the support flanks 40 come into contact with the disc at matching angled surfaces of the slot forcing reversal of the rotational adjustment. The clearance to the slot at the lands 42 is thereby reduced. As a consequence, the range of tilt angles permitted to the blade is curtailed, and blade can achieve very nearly the same position every time the spool is spun up.

The final fit across the raised lands 42 to the disc slot width can vary according to nominal dimensions and tolerances. If the end result is an interference fit, the blade will only ever' sit in one position, but additional stresses may be set up in the blade and disc. On the other hand, if there is a small resultant clearance fit, no additional stresses will be set up, but the blade will still have the freedom to tilt slightly. During detailed blade and slot design a compromise can thus be reached between stresses and tilt.

Advantageously, the repeatable blade position in the disc maintains a consistent blade tip position on all engine runs. This reduces running tip clearances, and hence improves compressor efficiency and surge margin. As the blade tips can perform as more efficient cutting tools, blade vibration and frictional heat build-up can also be reduced. The vibration reduction can decrease the potential for tip cracking, and the reduced heat build-up can reduce a tendency to overcut soft abradable liners.

Figure 9:
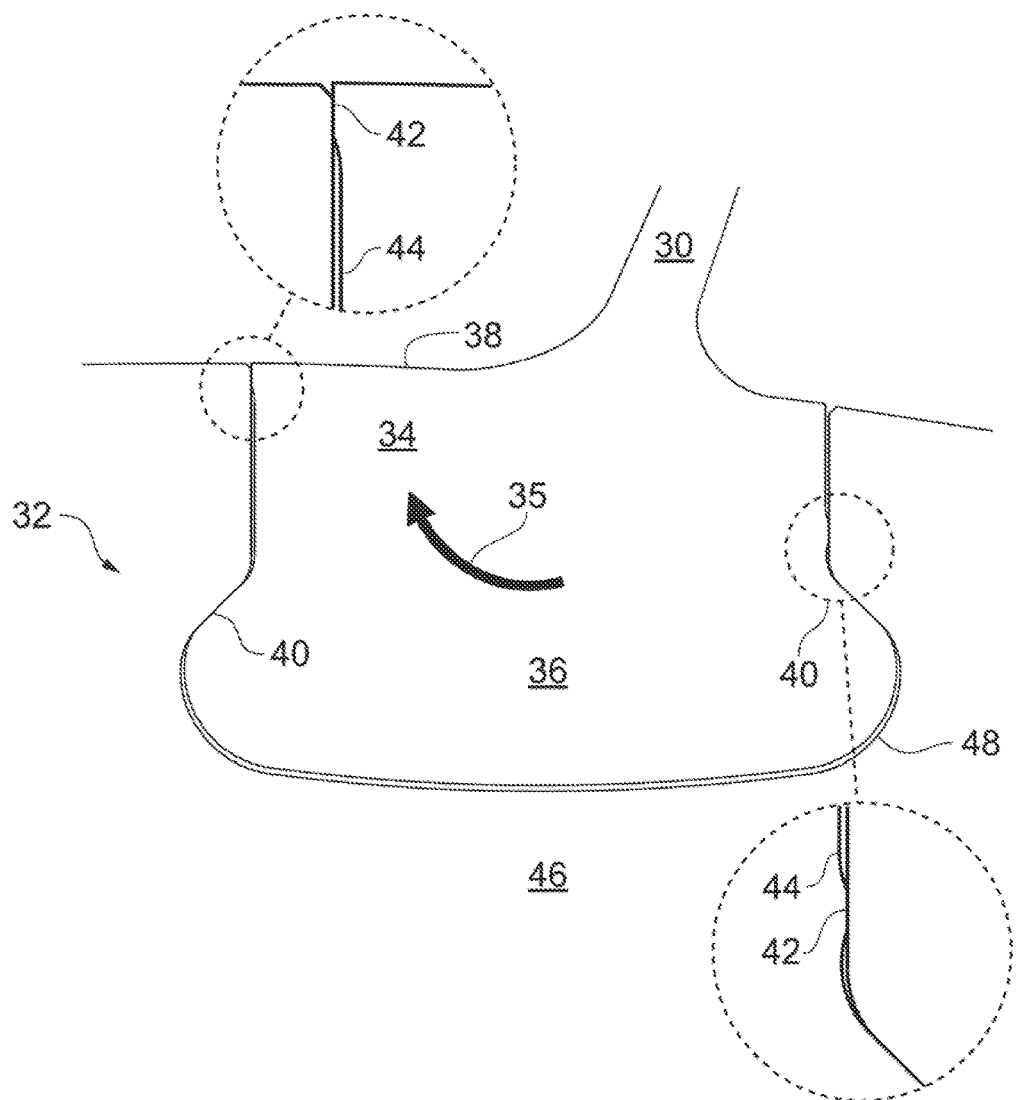
FIG. 9 shows schematically a cross-section through the dovetail root fixing of a variant compressor blade and the corresponding compressor disc slot.

FIG. 9 shows schematically a cross-section through the dovetail root fixing of a variant of the compressor blade and the corresponding compressor disc slot. Reference numbers used in FIG. 9 are the same as those used in FIGS. 7 and 8 to the extent that they apply to corresponding features. In the variant, rather than having the raised lands 42 at opposite ends of the neck portion 34, they can now be at the same distance along the length of the neck portion. However, they are offset from each other by virtue of being located at different radial heights. Thus, as illustrated in FIG. 9, the left hand land is at the top of the neck portion and the right hand land is at the bottom of the neck portion. The rotational adjustment to the blade needed to provide adequate clearance at the lands and prevent interference with the sides of the slot 48 when the dovetail root fixing slides in the slot is thus about the length direction of the slot rather than about radial direction of the engine. To locate the aerofoil in the slot a slight rotation is required around the axis as shown by arrow 35.

When the spool rotates and both blade support flanks 40 are centrifuged into contact with the matching angled surfaces of the slot 48, the rotational adjustment is reversed and the clearance across the neck portion 34 at the raised lands 42 becomes either a small clearance or light interference fit. Again, this can ensure that the blade achieves very nearly the same position every time the spool is spun up.

Figure 10:
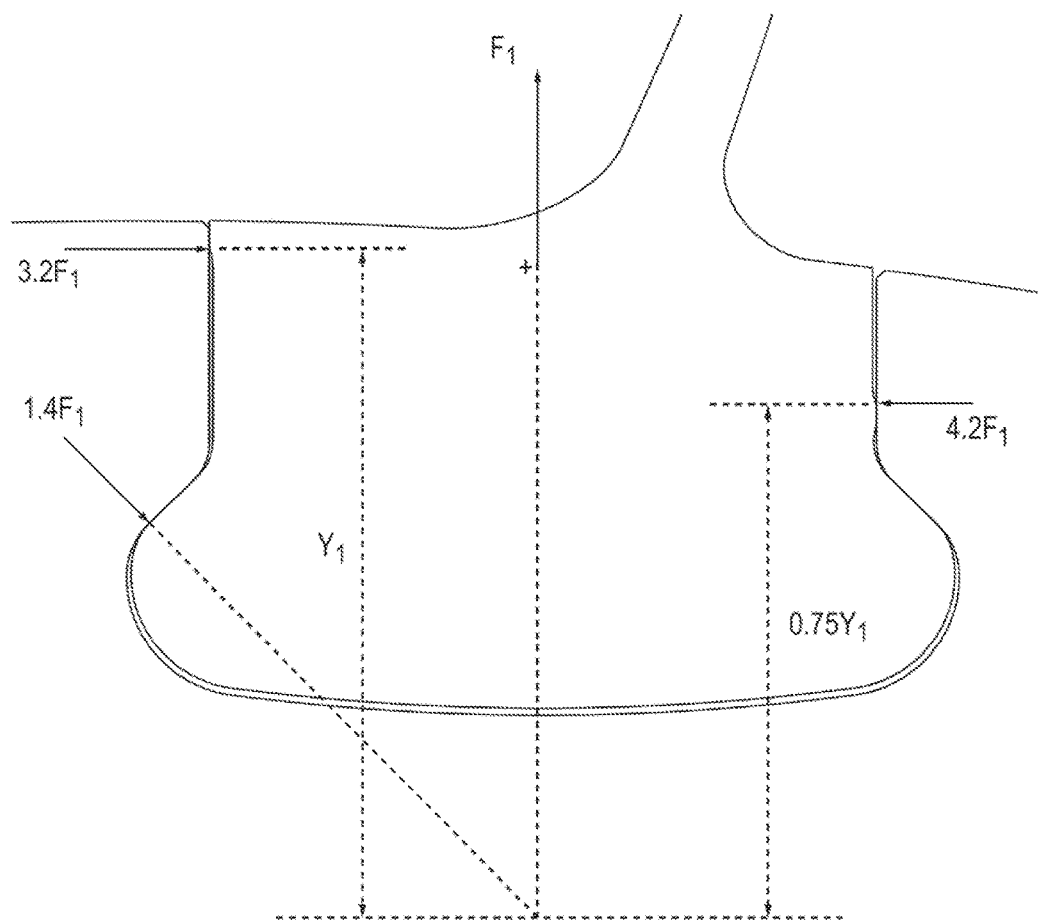
FIG. 10 is a free body diagram for the dovetail root fixing of FIG. 9.

In the event of a light interference condition across the neck portion 34 at the raised lands 42 at spool start up, of the two support flanks 40, only the left hand support flank in FIG. 9 will initially engage the disk 46. However, as the spool speeds up and the blade centrifuges outwards with greater and greater force, the blade will move outward until the right hand support flank also comes into contact with the disc, the raised lands having been deformed to relieve the interference fit. FIG. 10 is a free body diagram for the dovetail root fixing of FIG. 9 in the condition that there is light interference condition across the neck portion 34 at the raised lands and only the left hand support flank is engaging the disk 46. The diagram shows that the forces that would be imparted on the raised zones are large multiples of the centrifugal force F1. With small contact areas creating high bedding stress, the raised zones would undergo localised deformation until the right hand support flank came into contact.

Figure 11:
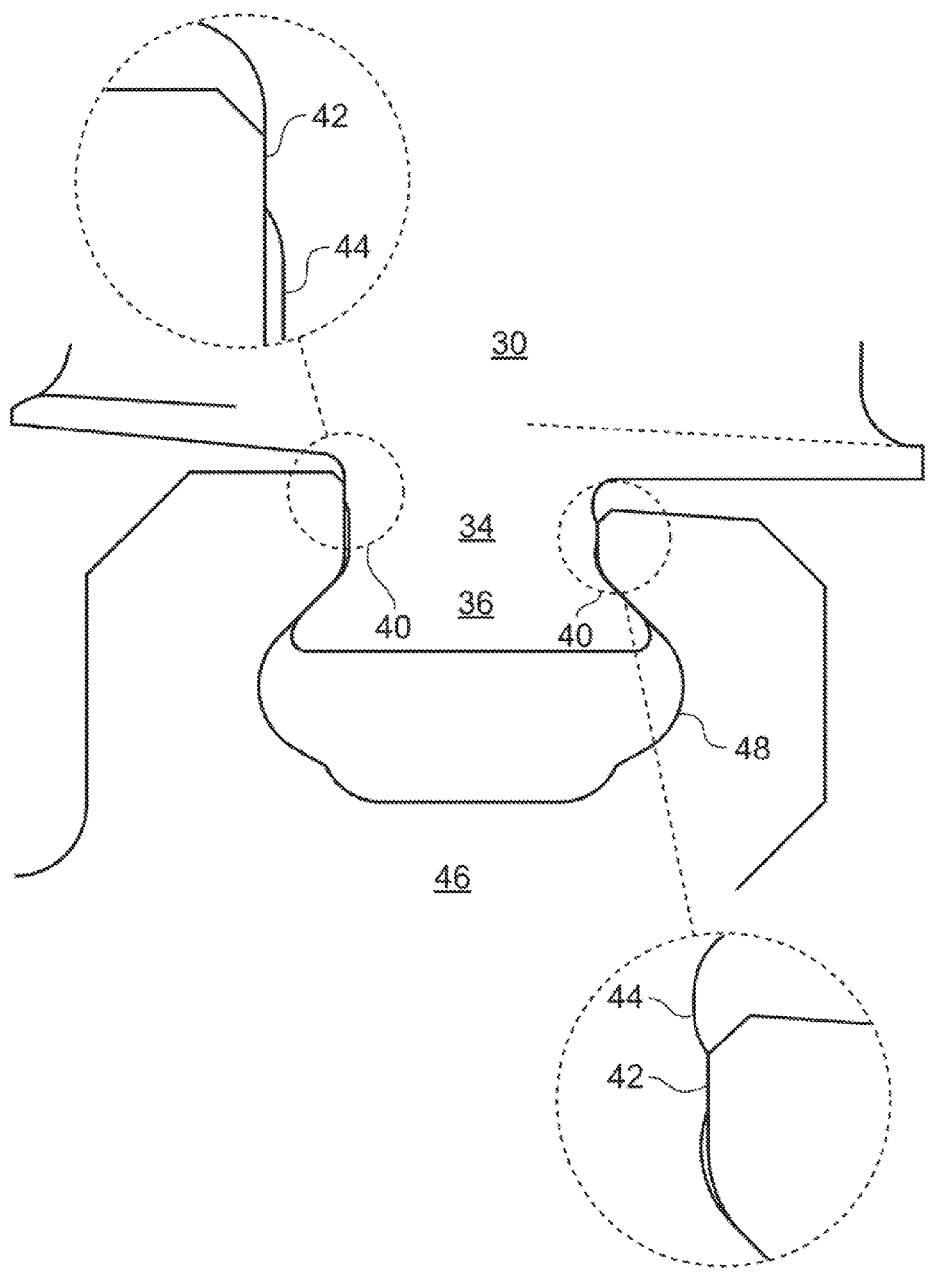
FIG. 11 shows a cross-sectional view through the dovetail root fixing of a compressor blade and a corresponding circumferential compressor disc slot during spool rotation and includes close-up views of raised lands on both sides of a neck portion of the dovetail root fixing.
Figure 12:
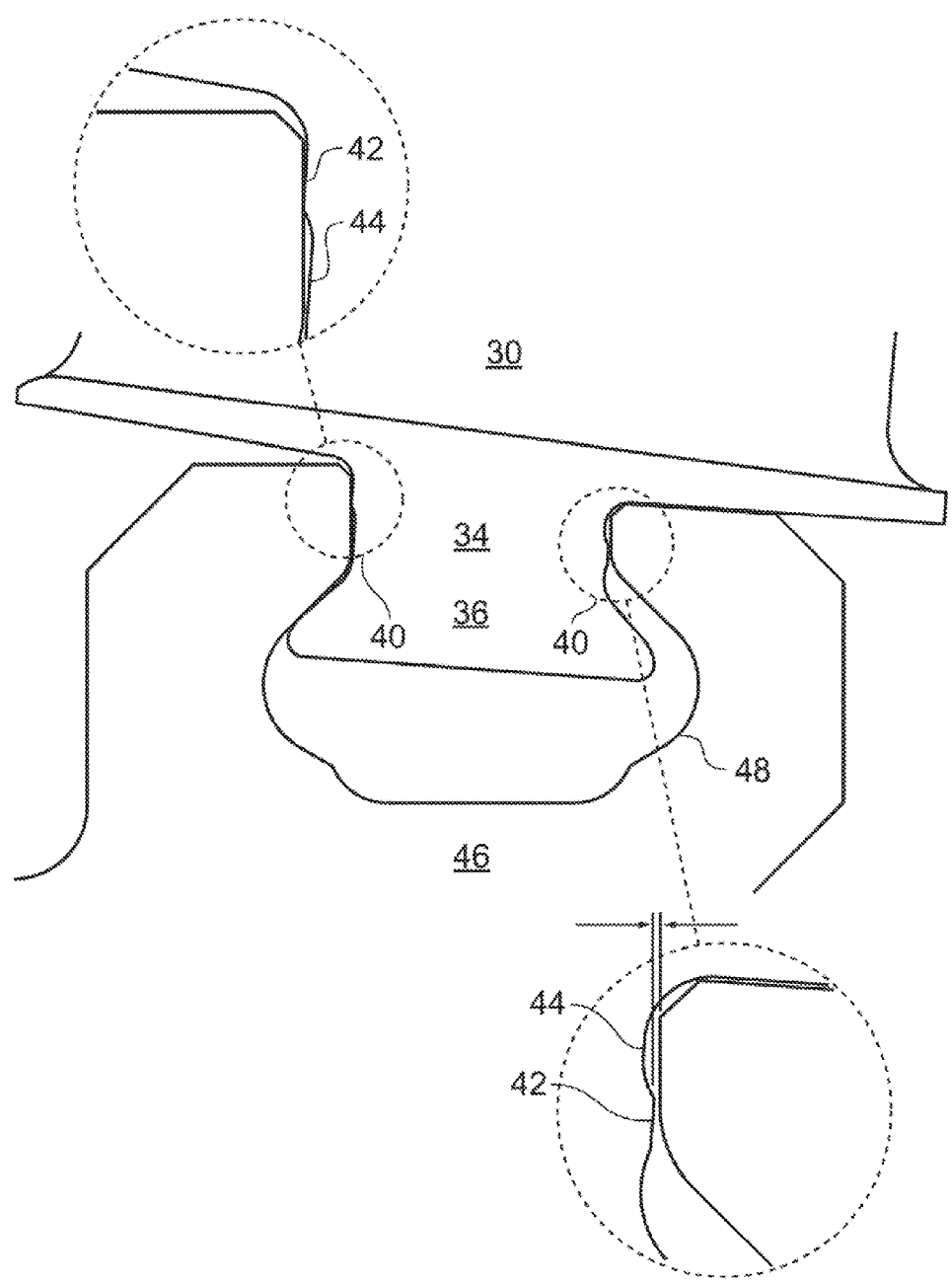
FIG. 12 shows the cross-sectional and close-up views of FIG. 11 with the spool stationary and the blade able to slide in the slot.

In FIGS. 7 and 8 the slot is a skewed axial slot, and in FIGS. 9 and 10 it is an axial or skewed axial slot. However, the invention may also be applied to blades for circumferential slots, as shown in FIGS. 11 and 12. Again, reference numbers used in FIGS. 11 and 12 are the same as those used in FIGS. 7 to 10 to the extent that they apply to corresponding features.

The cross-sectional view of FIG. 11 shows the dovetail root fixing 3 during spool rotation. The neck portion 34 has radially offset raised lands 42, similarly to the dovetail root fixing of FIGS. 9 and 10. The two support flanks 40 of the dovetail portion 36 engage with the matching angled surfaces of the slot 48, thereby forcing a reversal of the rotational adjustment of the blade about the length direction of the slot that was needed to provide adequate clearance at the lands to allow the dovetail root fixing to slide into the slot. This reversal reduces the clearance at the lands or produces an interference fit such that the blade achieves very nearly the same position every time the spool is rotated.

FIG. 12 shows the cross-sectional view of FIG. 11 with the spool stationary. To allow the blade to slide in the slot 48, the rotational adjustment is applied to the blade, producing an assembly clearance at the neck portion 34 which is best illustrated in the close-up view for the right hand land 42.

While the invention has been described in conjunction with the exemplary embodiments described above, many equivalent modifications and variations will be apparent to those skilled in the art when given this disclosure. For example, the invention may be applied to any turbomachine where a blade is held to a rotor by a dovetail root fixing, such as in a steam turbine engine. Accordingly, the exemplary embodiments of the invention set forth above are considered to be illustrative and not limiting. Various changes to the described embodiments may be made without departing from the spirit and scope of the invention.

The invention claimed is:

1. A turbomachine aerofoil blade comprising:
an aerofoil body portion; and
a dovetail root fixing disposed at a base of the aerofoil body portion, the dovetail root fixing being configured to slide, in use, into a correspondingly shaped slot of a rotor of a turbomachine, the dovetail root fixing having a neck portion, and a dovetail portion, the dovetail portion extending outwardly from the neck portion to provide angled support flanks at each side of the dovetail root fixing, the angled support flanks engaging with matching angled surfaces of the slot under centrifugal loading of the aerofoil blade to support the aerofoil blade on the rotor of the turbomachine, wherein:
the neck portion has a raised land at each side of the neck portion, such that a rotational adjustment of the aerofoil blade, relative to an angular position of the aerofoil blade when supported under centrifugal loading, is needed to provide a clearance at each raised land of the neck portion to prevent interference between each side of the slot and each raised land, respectively, when the dovetail root fixing is in the slot;
when the aerofoil blade is under centrifugal loading, engagement of the angled support flanks with the matching angled surfaces of the slot forces a reversal of the rotational adjustment and reduces the clearance at the raised lands; and
the raised lands are axially offset from each other on each respective side of the neck portion, when viewed in a cross-section of the neck portion perpendicular to an axis of the rotational adjustment.

2. The aerofoil blade according to claim 1, wherein the reversal of the rotational adjustment reduces the clearance to produce an interference fit at the raised lands.

3. The aerofoil blade according to claim 1, wherein the axis of the rotational adjustment is a radial direction of the turbomachine.

4. The aerofoil blade according to claim 1, wherein the axis of the rotational adjustment is along a direction of the slot.

5. The aerofoil blade according to claim 1, wherein the aerofoil blade is a compressor blade of a gas turbine engine.

6. A turbomachine rotor having a row of aerofoil blades according to mounted on the turbomachine rotor, wherein the dovetail root fixing of each aerofoil blade is located in a correspondingly shaped slot of the turbomachine rotor.

7. A gas turbine engine having a compressor stage including the rotor and the row of aerofoil blades of claim 6.

8. The aerofoil blade according to claim 1, wherein each side of the neck portion provides one of the raised lands at an end of each side of the neck portion, a remaining portion of each respective side of the neck portion includes a cut-back zone.

9. The aerofoil blade according to claim 8, wherein the raised lands are located at opposite ends of the neck portion.

10. The aerofoil blade according to claim 8, wherein at least one of the raised lands is circumferentially opposed by a recess on an opposing side of the neck portion.

11. The aerofoil blade according to claim 8, wherein one of the raised lands is adjacent to an air-washed platform at a base of the aerofoil body portion.

12. The aerofoil blade according to claim 8, wherein one of the raised lands is adjacent to a radially outer surface of the rotor when the dovetail root fixing is located in the slot.

13. The aerofoil blade according to claim 8, wherein one of the raised lands is adjacent to the dovetail portion.

14. The aerofoil blade according to claim 8, wherein one of the raised lands is adjacent to one of the angled support flanks.

15. The aerofoil blade according to claim 8, wherein respective raised lands disposed at each side of the neck portion are disparately spaced from an air-washed platform at a base of the aerofoil body portion.

16. The aerofoil blade according to claim 8, wherein respective raised lands at each side of the neck portion are disparately spaced from the dovetail portion.

17. A turbomachine aerofoil blade comprising:
an aerofoil body portion; and
a dovetail root fixing disposed at a base of the aerofoil body portion, the dovetail root fixing being configured to slide, in use, into a correspondingly shaped slot of a rotor of a turbomachine, the dovetail root fixing having a neck portion, and a dovetail portion, the dovetail portion extending outwardly from the neck portion to provide angled support flanks at each side of the dovetail root fixing, the angled support flanks engaging with matching angled surfaces of the slot under centrifugal loading of the aerofoil blade to support the aerofoil blade on the rotor of the turbomachine, wherein:
the neck portion has a respective raised land at each side of the neck portion, such that a rotational adjustment of the aerofoil blade, relative to an angular position of the aerofoil blade when supported under centrifugal loading, is needed to provide a clearance at each raised land of the neck portion to prevent interference between each side of the slot and each raised land, respectively, when the dovetail root fixing is in the slot;
when the aerofoil is under centrifugal loading, engagement of the angled support flanks with the matching angled surfaces of the slot forces a reversal of the rotational adjustment and reduces the clearance at the raised lands; and
the raised lands are radially offset from each other on each respective side of the neck portion, when viewed in a cross-section of the neck portion perpendicular to an axis of the rotational adjustment.

* * * * *